US012393733B2

(12) United States Patent
Okuma

(10) Patent No.: US 12,393,733 B2
(45) Date of Patent: Aug. 19, 2025

(54) INFORMATION PROCESSING DEVICE, CONTROL METHOD, AND PROGRAM

(71) Applicant: CASIO COMPUTER CO., LTD., Tokyo (JP)

(72) Inventor: Kentaro Okuma, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 217 days.

(21) Appl. No.: 18/026,179

(22) PCT Filed: Aug. 30, 2021

(86) PCT No.: PCT/JP2021/031796
§ 371 (c)(1),
(2) Date: Mar. 14, 2023

(87) PCT Pub. No.: WO2022/059474
PCT Pub. Date: Mar. 24, 2022

(65) Prior Publication Data
US 2023/0367909 A1 Nov. 16, 2023

(30) Foreign Application Priority Data

Sep. 15, 2020 (JP) .................................. 2020-154936
Sep. 15, 2020 (JP) .................................. 2020-154937

(51) Int. Cl.
*G06F 21/62* (2013.01)
(52) U.S. Cl.
CPC .................................. *G06F 21/629* (2013.01)
(58) Field of Classification Search
CPC .................................................. G06F 21/629
See application file for complete search history.

(56) References Cited

U.S. PATENT DOCUMENTS 8,434,145 B2 * 4/2013 Urasawa ................. G06F 21/31
726/19
9,460,283 B2 * 10/2016 Gnesda ................. G06F 21/562
(Continued)

FOREIGN PATENT DOCUMENTS

| JP | 2017026827 A | 2/2017 |
| JP | 2017174191 A | 9/2017 |
| JP | 2019161668 A | 9/2019 |

OTHER PUBLICATIONS

International Search Report dated Nov. 16, 2021 issued in PCT/JP2021/031796.
(Continued)

*Primary Examiner* — Viral S Lakhia
(74) *Attorney, Agent, or Firm* — Scully, Scott, Murphy & Presser, P.C

(57) ABSTRACT

An information processing device includes a communication unit that communicates with an external terminal, and a controller that, when receiving release instruction information instructing release of a function restriction mode from an external terminal in a state in which a usable function is restricted based on transition instruction information received from a predetermined external terminal and instructing a transition to the function restriction mode, controls release of the function restriction mode based on a result of determining as to whether the predetermined external terminal that has transmitted the transition instruction information and the external terminal that has transmitted the release instruction information match each other.

18 Claims, 11 Drawing Sheets

(56) References Cited

U.S. PATENT DOCUMENTS

| | | | |
|---|---|---|---|
| 9,805,220 B2* | 10/2017 | Yamaguchi | H04L 63/108 |
| 9,818,136 B1* | 11/2017 | Hoffberg | G07F 17/323 |
| 9,985,783 B2* | 5/2018 | Kakutani | G06F 21/72 |
| 10,001,919 B2* | 6/2018 | Lee | G06F 3/0488 |
| 10,135,869 B2* | 11/2018 | Tsuchitoi | H04W 12/086 |
| 10,263,990 B2* | 4/2019 | Son | H04L 63/20 |
| 11,950,151 B2* | 4/2024 | Chou | H04W 24/02 |
| 2016/0048664 A1* | 2/2016 | Son | H04L 67/34 |
| | | | 726/19 |
| 2017/0011239 A1* | 1/2017 | Chapman | G09B 5/00 |
| 2017/0228530 A1* | 8/2017 | Jung | G06F 21/31 |
| 2017/0280269 A1 | 9/2017 | Iwasaki | |
| 2018/0218150 A1* | 8/2018 | Angelino | G06F 21/70 |
| 2021/0063526 A1* | 3/2021 | Aasen | H04B 11/00 |
| 2022/0086669 A1* | 3/2022 | Yao | H04L 43/20 |

OTHER PUBLICATIONS

Written Opinion of the International Searching Authority dated Nov. 16, 2021 received in International Application No. PCT/JP2021/031796.

Extended European Search Report dated Feb. 19, 2024 received in European Patent Application No. EP 1 21869161.6.

* cited by examiner

FIG. 7A

| | A | B | C | D |
|---|---|---|---|---|
| 1 | 1 | 4 | 2 | 123 |
| 2 | 2 | 8 | 4 | 456 |
| 3 | 3 | 12 | 8 | 789 |
| 4 | 4 | 16 | 16 | |

| | x | | y |
|---|---|---|---|
| 1 | 1 | 1 | 3 |
| 2 | 2 | 2 | 9 |
| 3 | 3 | 3 | 27 |
| 4 | 4 | 4 | 81 |

1006

3

```
Pen Down                    ─ 1007a
Direction 10 degr
Move 20 pixels
Turn ↻ 30 degrees
```

```
Move 20 pixels              ─ 1007b
Turn ↻ 150 degree
Move 20 pixels
```

INFORMATION PROCESSING DEVICE, CONTROL METHOD, AND PROGRAM

TECHNICAL FIELD

The disclosure of the present specification relates to an information processing device, a control method, and a program.

BACKGROUND ART

In recent years, teachers and students are using information processing devices such as tablet-type computers and smart phones in school classes and the like. For example, Patent Literature 1 suggests a learning support system capable of interactively conducting a test in class between a teacher and a student in real time.

In addition, in recent academic-achievement tests, certification tests and the like, there are cases in which the use of a calculator called a scientific electronic calculator having a calculation function relating to scientific and technical calculations as well as four arithmetic operations is permitted. In the case in which the use of a scientific electronic calculator is permitted in academic-achievement tests, and the like, in order to prevent cheating such as using a function or a program prepared in advance by a user during a test, and browsing, during a test, a text or an image prepared in advance by a user before the test, usable functions may be limited during the test.

CITATION LIST

Patent Literature

Patent Literature 1: JP2017-026827A

SUMMARY OF INVENTION

Technical Problem

However, in the scientific electronic calculator of the related art, after starting a test with usable functions being restricted, an operation to release the function restriction may be performed during the test, and therefore, cheating of using functions that are prohibited from being used in the test may be conducted.

In view of the above situation, an object of one aspect of the present invention is to provide a technology capable of restricting a user from using a function of an information processing device during a test, which is prohibited from being used in the test.

Solution to Problem

An information processing device according to one aspect of the present invention is an information processing device including: a communication unit configured to communicate with an external terminal; and a control unit configured, when receiving release instruction information instructing release of a function restriction mode from an external terminal in a state in which a usable function is restricted based on transition instruction information received from a predetermined external terminal and instructing a transition to the function restriction mode, to control release of the function restriction mode based on a result of determination as to whether the predetermined external terminal that has transmitted the transition instruction information and the external terminal that has transmitted the release instruction information match each other.

A control method according to one aspect of the present invention is a control method including, when release instruction information instructing release of a function restriction mode is received from an external terminal in a state in which a usable function is restricted based on transition instruction information received from a predetermined external terminal and instructing a transition to the function restriction mode, controlling, by an information processing device capable of communicating with an external terminal, release of the function restriction mode based on a result of determination as to whether the predetermined external terminal that has transmitted the transition instruction information and the external terminal that has transmitted the release instruction information match each other.

A program according to one aspect of the present invention is a program configured to cause an information processing device capable of communicating with an external terminal to execute processing of, when release instruction information instructing release of the function restriction mode is received from an external terminal in a state in which a usable function is restricted based on transition instruction information received from a predetermined external terminal and instructing a transition to a function restriction mode, controlling release of the function restriction mode based on a result of determination as to whether the predetermined external terminal that has transmitted the transition instruction information and the external terminal that has transmitted the release instruction information match each other.

Advantageous Effects of Invention

According to the above aspects, it is possible to restrict a user from using a function of an information processing device during a test, which is prohibited from being used in the test.

BRIEF DESCRIPTION OF DRAWINGS

FIG. 7A is a view (2 thereof) illustrating an example of data that is held by the scientific electronic calculator during the test mode.

FIG. 7B is a view (2 thereof) illustrating an example of data that is held by the scientific electronic calculator during the test mode.

DESCRIPTION OF EMBODIMENTS

Hereinafter, embodiments of the present invention will be described with reference to the drawings. Note that, in the following description, a calculator called a scientific electronic calculator having calculation functions and the like relating to scientific and technical calculations as well as four arithmetic operations will be described as an example of the information processing device according to the present invention. In the following description, detailed descriptions of well-known functions, configurations, operations, etc. in the scientific electronic calculator are omitted.

Figure 1:
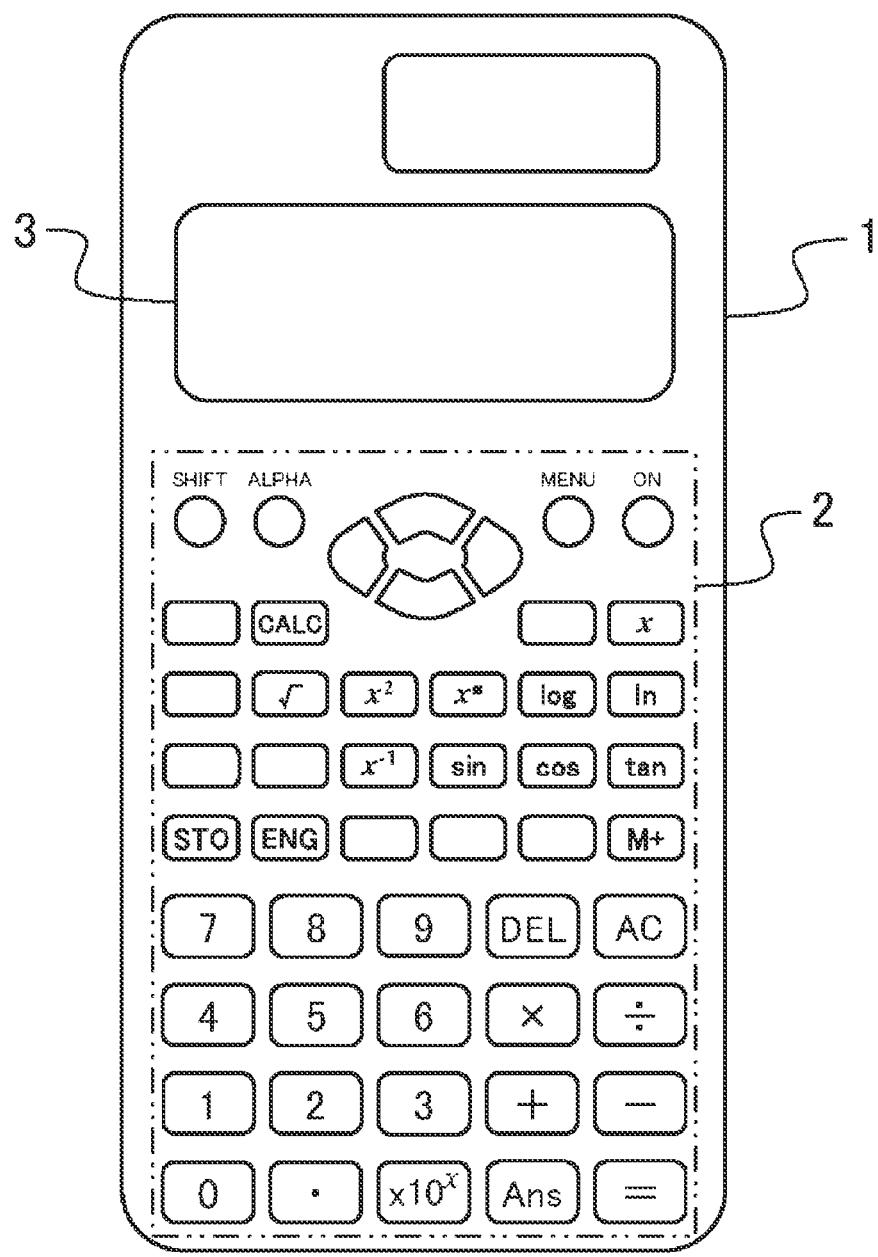
FIG. 1 is a front view showing an example of an appearance of a scientific electronic calculator.

FIG. 1 is a front view showing an example of an appearance of a scientific electronic calculator. In the scientific electronic calculator 1 shown in FIG. 1, a key arrangement unit 2 and a display 3 are provided on one surface of a housing.

In the key arrangement unit 2, a plurality of keys, such as keys for four arithmetic operations and keys for calculation of predetermined functions such as trigonometric functions, are arranged. A plurality of functions are assigned to some of the keys arranged in the key arrangement unit 2, and one function among the plurality of functions can be selected by combining with a shift key or a function key. The display 3 is a display device such as a liquid crystal monitor configured to display an arithmetic expression input using the keys of the key arrangement unit 2, a calculation result, a menu screen, and the like.

The scientific electronic calculator 1 shown in FIG. 1 can prepare functions or programs by operating the keys arranged in the key arrangement unit 2, and the prepared functions or programs can be stored in the scientific electronic calculator 1, as user data. In addition, the scientific electronic calculator 1 can be used in an academic-achievement test, a certification test, and the like by restricting a usable function (for example, by prohibiting execution of arithmetic processing using a predetermined function or program). In the following description, with respect to a state of the scientific electronic calculator 1, a state in which a function is not restricted is referred to as "normal mode", and a state in which a function is restricted when used in an academic-achievement test or the like is referred to as "test mode". The test mode is an example of a function restriction mode in which a usable function is restricted by a predetermined external terminal (for example, a mode control terminal 6 in FIG. 2), which will be described later.

Figure 2:
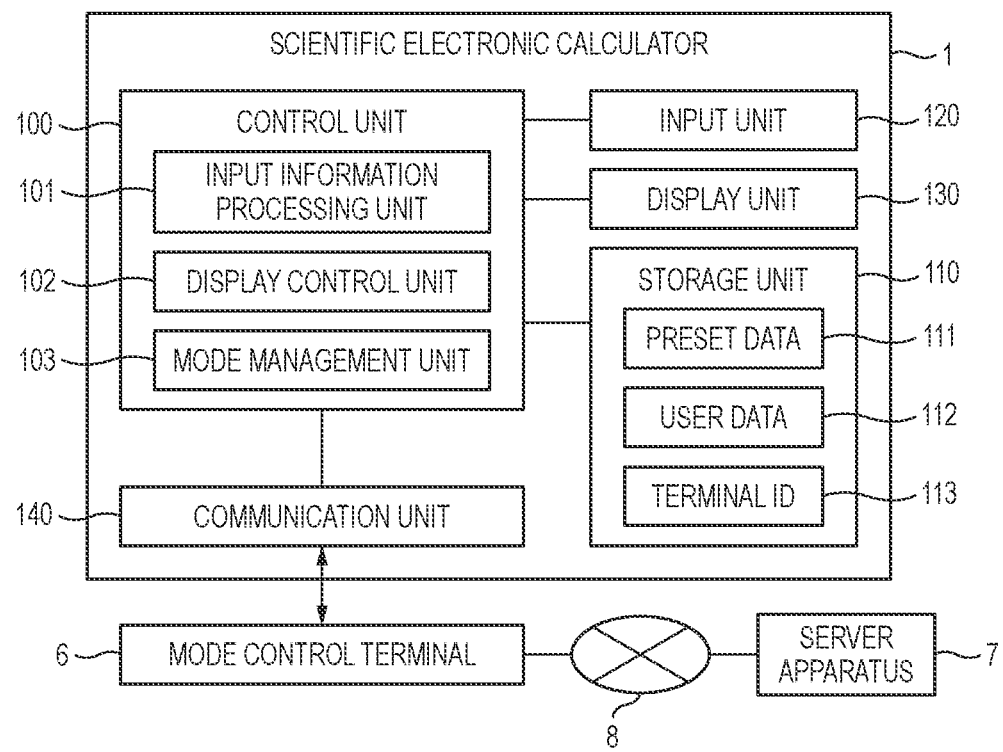
FIG. 2 is a block diagram showing an example of a functional configuration of the scientific electronic calculator according to one embodiment.

FIG. 2 is a block diagram showing an example of a functional configuration of the scientific electronic calculator according to one embodiment.

As shown in FIG. 2, the scientific electronic calculator 1 according to the present embodiment includes a control unit 100, a storage unit 110, an input unit 120, a display unit 130, and a communication unit 140. The input unit 120 corresponds to a plurality of keys in the key arrangement unit 2 described above, and the display unit 130 corresponds to the display 3 described above. The input unit 120 may include, for example, a digitizer (position detector) arranged overlapping a display area of the display unit 130 (display 3).

The control unit 100 is configured to control an overall operation of the scientific electronic calculator 1. The control unit 100 includes an input information processing unit 101, a display control unit 102, and a mode management unit 103. The input information processing unit 101 is configured to perform various processing such as numerical calculation and program preparation, based on input information input by the input unit 120. The display control unit 102 is configured to control display at the time when displaying the input information input by the input unit 120, a processing result of the input information processing unit 101, and the like on the display unit 130. The mode management unit 103 is configured to manage transition (entry) from the normal mode to the test mode and release of the test mode. The functions of each unit described above of the control unit 100 are implemented by a general-purpose processor such as a CPU (Central Processing Unit) configured to execute some programs stored in the storage unit 110 or the like. Some of the functions of each unit described above of the control unit 100 may be implemented by, for example, a field programmable gate array (FPGA) or an application specific integrated circuit (ASIC).

The storage unit 110 is configured to store various kinds of information relating to operations of the scientific electronic calculator 1. The storage unit 110 includes a first storage area 111 for storing data (preset data) such as functions and programs prepared in advance, a second storage area 112 for storing data (user data) such as functions, programs, texts and the like prepared by a user of the scientific electronic calculator 1, and a third storage area 113 for storing identification information (transition instruction terminal ID) of the mode control terminal 6 instructing transition to the test mode. The storage unit 110 includes a ROM (Read Only Memory) and a RAM (Random Access Memory), which are non-temporary storage media. The third storage area 113 may be provided in a buffer embedded in the processor, for example.

The communication unit 140 is configured to communicate with a wireless communication device (external terminal) such as the mode control terminal 6 by wireless communication according to a well-known short-distance wireless communication standard such as BLE (Bluetooth Low Energy (registered trademark)).

The mode control terminal 6 is a communication terminal capable of remotely controlling transition to the test mode of one or more scientific electronic calculators 1 and release of the test mode by wireless communication, and also communicating with an external apparatus such as a server apparatus 7 via a communication network 8. The communication network 8 is, for example, the Internet or LAN (Local Area Network). For the mode control terminal 6, for example, a general-purpose computer such as a tablet-type computer or an information processing device such as a smart phone can be used. The mode control terminal 6 is operated by a test examiner (grader) such as a teacher, for example. The mode control terminal 6 may be connected to a scientific electronic calculator, which does not include a wireless communication function and is different from the scientific electronic calculator 1 exemplified in the present embodiment, via a transmission cable such as a USB (Universal Serial Bus) cable, and may be able to control transition to the test mode of the scientific electronic calculator and release of the test mode.

In the normal mode, the scientific electronic calculator 1 of the present embodiment can execute all functions that can be executed in the scientific electronic calculator 1, such as function calculation using the preset data stored in the first storage area 111 of the storage unit 110. In addition, in the normal mode, the scientific electronic calculator 1 of the present embodiment can prepare a function or program based on the input information input by the input unit 120, and perform a calculation using the function or program. Further, in the normal mode, the scientific electronic calculator 1 of the present embodiment can store the function or program prepared based on the input information in the second storage area 112 of the storage unit 110, and call the function or program, as needed. Note that, the scientific electronic calculator 1 of the present embodiment may be able to perform functions other than the functions described above, such as browsing a text, an image or the like relating to scientific and technical calculations.

When using the scientific electronic calculator 1 of the present embodiment in an academic-achievement test or the like, from a standpoint of cheating prevention, for example, it is desired to prohibit the user data prepared before the test and stored in the second storage area 112 of the storage unit 110 from being used (e.g., calculation using a function or program prepared by the user, browsing of a text, an image, etc.). For this reason, when used in an academic-achievement test or the like, the scientific electronic calculator 1 of the present embodiment performs test mode management processing as shown in FIG. 3 in cooperation with the mode control terminal 6.

Figure 3:
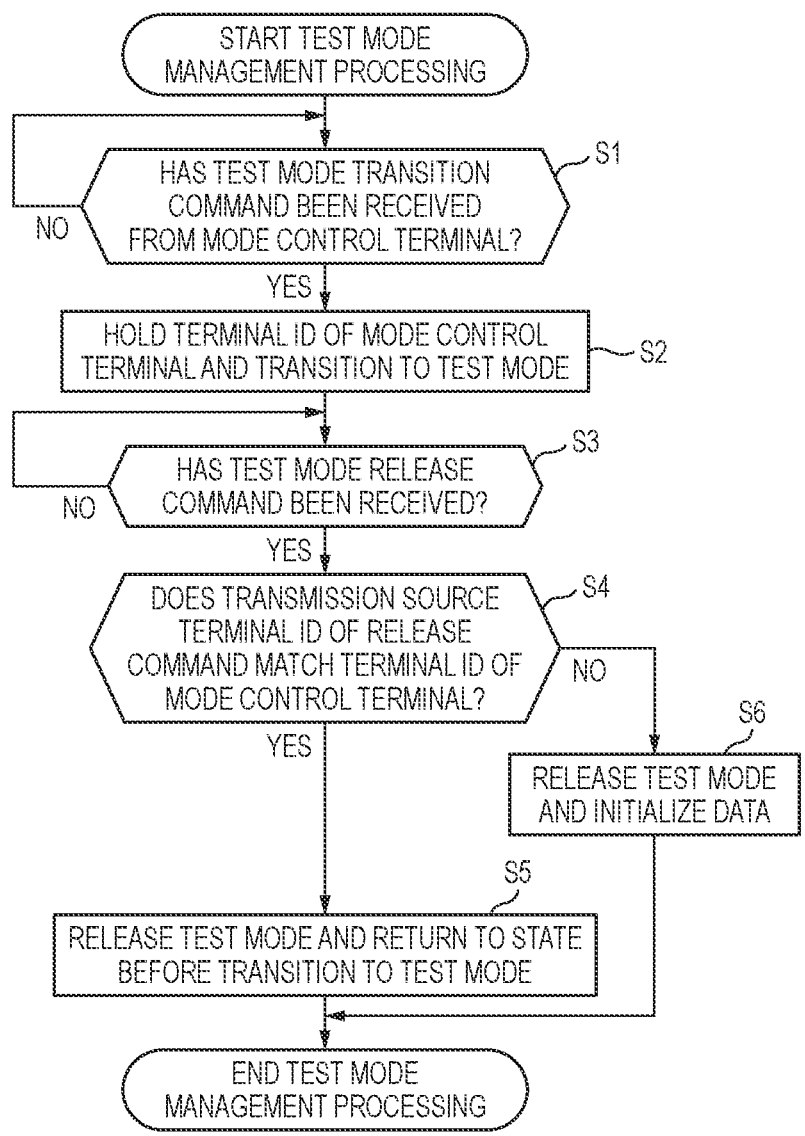
FIG. 3 is a flow chart illustrating an example of test mode management processing that is performed by the scientific electronic calculator according to one embodiment.

FIG. 3 is a flow chart illustrating an example of test mode management processing that is performed by the scientific electronic calculator according to one embodiment. The test mode management processing shown in FIG. 3 is performed, for example, after a power supply of the scientific electronic calculator 1 is turned on in a test site and wireless communication by the communication unit 140 is enabled.

In the test mode management processing, the mode management unit 103 of the control unit 100 of the scientific electronic calculator 1 first determines whether a test mode transition command has been received from the mode control terminal 6 (step S1). As will be described later with reference to FIG. 4, the test mode transition command received from the mode control terminal 6 includes a terminal ID for identifying the mode control terminal 6 and mode information regarding transition to the test mode. The test mode transition command is an example of transition instruction information received from the mode control terminal 6 and instructing transition to the test mode (function restriction mode). When the test mode transition command is not received (step S1; NO), the mode management unit 103 repeats the determination of step S1. When the test mode transition command is received (step S1; YES), the mode management unit 103 holds the terminal ID of the mode control terminal 6 and transitions to the test mode (step S2). In step S2, the mode management unit 103 stores, for example, the terminal ID of the mode control terminal 6 in the third storage area 113 of the storage unit 110, as a transition instruction terminal ID. Further, in step S2, the mode management unit 103 specifies, for example, processing that is prohibited in the test mode based on the mode information included in the test mode transition command, and starts monitoring and restricting processing that is performed by the input information processing unit 101. After step S2, when a test is started, the scientific electronic calculator 1 may perform arithmetic processing based on the input information input by the input unit 120 within a permitted range in the test mode, in parallel with the test mode management processing shown in FIG. 3.

After transitioning to the test mode, the mode management unit 103 determines whether a test mode release command from the external terminal has been received by the communication unit 140 (step S3). The test mode release command is an example of release instruction information instructing release of the test mode (function restriction mode) of the scientific electronic calculator 1. When the test mode release command is not received (step S3; NO), the mode management unit 103 repeats the determination of step S3.

When the test mode release command is received (step S3; YES), the mode management unit 103 determines whether a transmission source terminal ID of the release command matches the terminal ID of the mode control terminal 6 (step S4). In step S4, the mode management unit 103 determines whether the transmission source terminal ID included in the test mode release command and the transition instruction terminal ID stored in the third storage area 113 of the storage unit 110 match each other.

When the transmission source terminal ID of the test mode release command matches the terminal ID of the mode control terminal 6 (step S4; YES), the mode management unit 103 releases the test mode, returns the scientific electronic calculator 1 to a state before the transition to the test mode (step S5), and ends the test mode management processing. In step S5, when the mode management unit 103 releases the test mode and returns to the normal mode, the mode management unit enables all of the usable functions before the transition to the test mode. For this reason, after the processing of step S5, the scientific electronic calculator 1 can execute usable functions before the transition to the test mode and are prohibited from being used during the test mode, such as calculations using functions stored in the second storage area 112 before the transition to the test mode.

On the other hand, when the transmission source terminal ID of the test mode release command does not match the terminal ID of the mode control terminal 6 (step S4; NO), the mode management unit 103 releases the test mode, initializes data (step S6), and ends the test mode management processing. In step S6, the mode management unit 103 deletes the user data such as functions stored in the second storage area 112 before the transition to the test mode, for example. For this reason, when the test mode release command is received from an external terminal separate from the mode control terminal 6, the user of the scientific electronic calculator 1 cannot use functions and the like stored in the second storage area 112 before the transition to the test mode, after the test mode release.

In this way, when, in a state in which a usable function is restricted based on the test mode transition command received from a predetermined external terminal (mode control terminal 6), the test mode release command is received from an external terminal, the scientific electronic calculator 1 of the present embodiment determines whether the external terminal that has transmitted the test mode release command is the same as the external terminal that has transmitted the test mode transition command, and controls the release operation of the test mode, based on a result of the determination.

Figure 4:
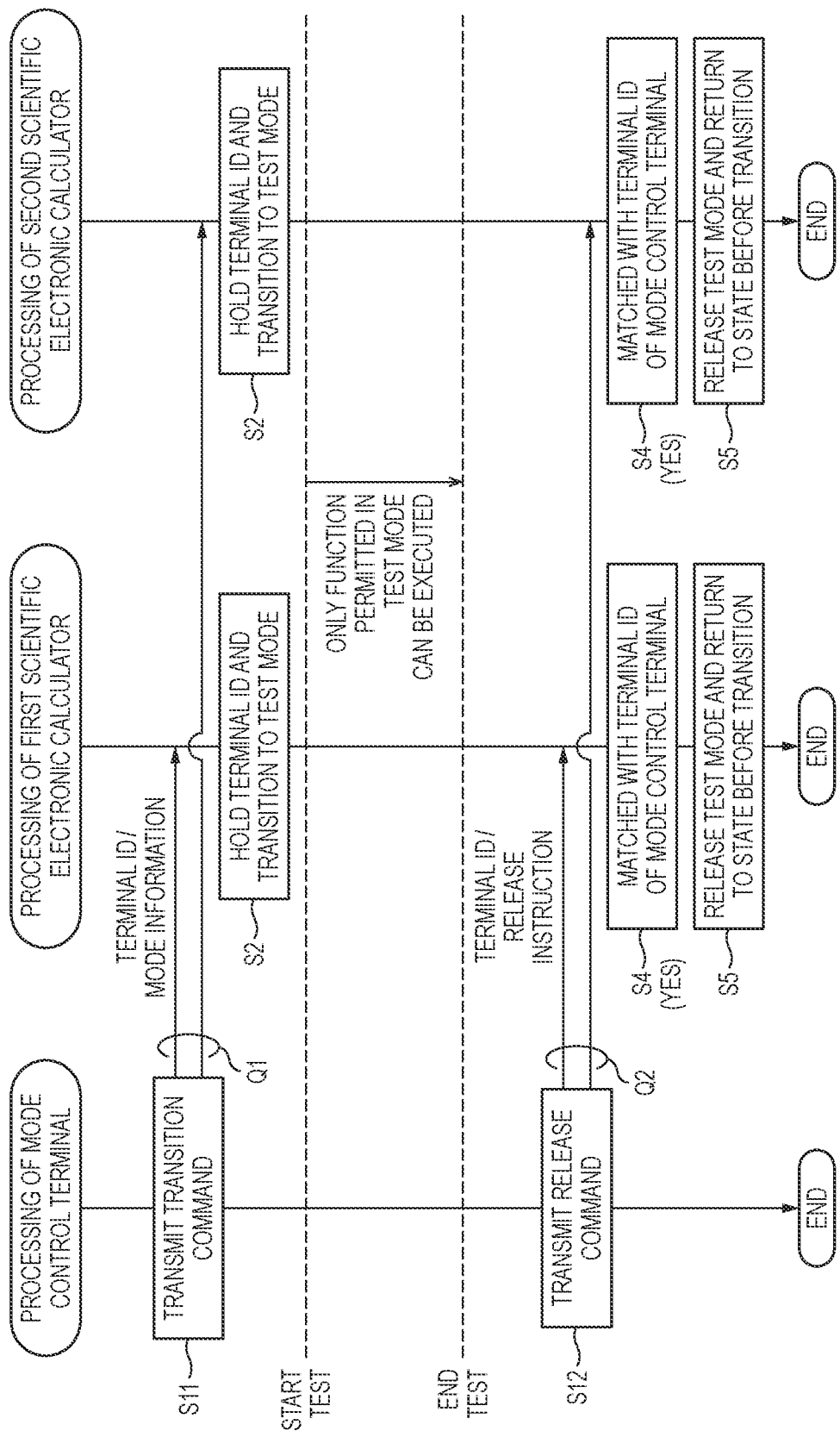
FIG. 4 is a sequence diagram illustrating processing that is performed by a mode control terminal and the scientific electronic calculator when conducting a test.

FIG. 4 is a sequence diagram illustrating processing that is performed by the mode control terminal and the scientific electronic calculator when conducting a test. FIG. 4 shows an example of operations of the mode control terminal 6 and each scientific electronic calculator 1 when each of the two scientific electronic calculators performs the test mode management processing shown in FIG. 3.

In a case in which a test in which the scientific electronic calculator 1 can be used is conducted, a plurality of scientific electronic calculators 1 including a first scientific electronic calculator and a second scientific electronic calculator exist in a test site. Before the start of the test, when a test examiner such as a teacher performs a predetermined operation on the mode control terminal 6, the mode control terminal 6 transmits a test mode transition command Q1 toward each of the scientific electronic calculators 1 in the test site by short-distance wireless communication such as BLE (step S11). The test mode transition command Q1 includes a terminal ID for identifying the mode control terminal 6 and mode information. The mode information includes, for example, information indicating a function (or a usable function) that is prohibited from being used when the scientific electronic calculator 1 transitions to the test mode.

The scientific electronic calculators 1 that have received the test mode transition command Q1 each store and hold the terminal ID included in the received test mode transition command Q1 in the third storage area 113 of the storage unit 110, as a transition instruction terminal ID, and transition to the test mode (step S2). After step S2, each scientific electronic calculator 1 can execute only a function that is permitted in the test mode. That is, in a period from the start to the end of the test, each scientific electronic calculator 1 can execute only a function that is permitted in the test mode. For this reason, for example, when the mode information of the test mode transition command Q1 is information indicating that the user data such as functions and the like stored in the second storage area 112 is prohibited from being used, the user of the scientific electronic calculator 1 cannot cause the scientific electronic calculator 1 to execute calculations using the functions stored in the storage area 112, during the test. In addition, the mode information of the test mode transition command Q1 may include, for example, information indicating a usable function among the preset data such as functions and the like stored in the first storage area 111 of the storage unit 110 of the scientific electronic calculator 1. By restricting usable functions, for example, it is possible to cause only the same functions to be used in a plurality of types of scientific electronic calculators 1 having different numbers of functions and programs included in the preset data, and therefore, to reduce inequity according to models.

After the test is finished, when the test examiner such as a teacher performs a predetermined operation on the mode control terminal 6, the mode control terminal 6 transmits a test mode release command Q2 toward each of the plurality of scientific electronic calculators 1 present in the test site (Step S12).

The scientific electronic calculators 1 that have received the test mode release command Q2 each compare the terminal ID included in the received test mode release command Q2 with the transition instruction terminal ID stored in the third storage area 113 of the storage unit 110, and determine that the two terminal IDs match (step S4; YES). Thereby, each scientific electronic calculator 1 releases the test mode and returns the state of its own device to the state before the transition to the test mode (step S5). For this reason, for example, when the mode information of the test mode transition command Q1 is information indicating that the user data such as functions and the like stored in the second storage area 112 is prohibited from being used, the user of the scientific electronic calculator 1 can cause the scientific electronic calculator 1 to execute calculations using the functions stored in the storage area 112, after the end of the test.

In addition, as exemplified in the present embodiment, the test mode transition command Q1 and the test mode release command Q2 are transmitted using short-range wireless communication such as BLE, so that a plurality of scientific electronic calculators 1 present in the test site can be efficiently caused to transition to the test mode and to release the test mode.

Figure 5:
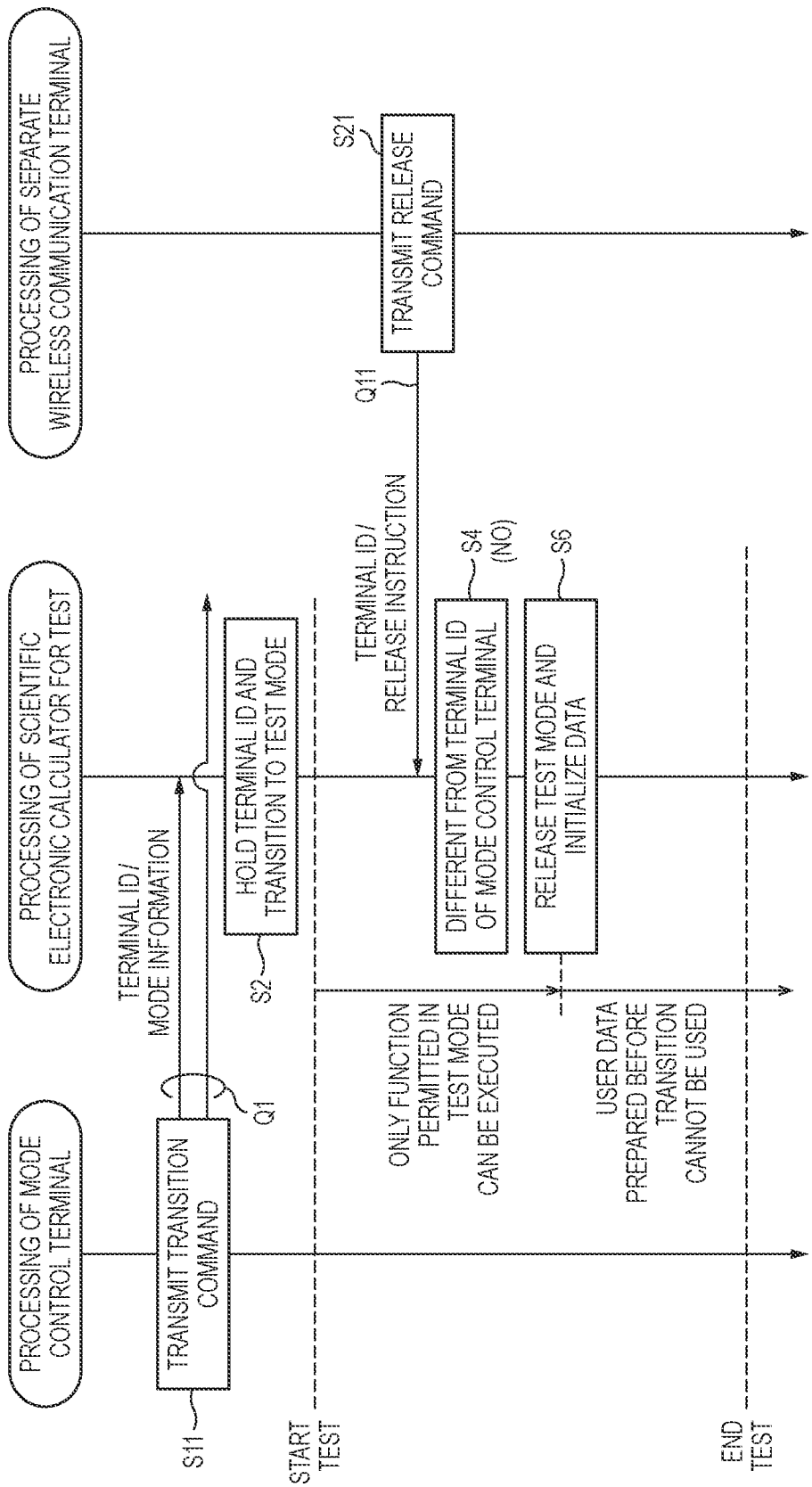
FIG. 5 is a sequence diagram illustrating an example of processing that is performed by the scientific electronic calculator when an attempt is made to release a test mode of the scientific electronic calculator during a test.

FIG. 5 is a sequence diagram illustrating an example of processing that is performed by the scientific electronic calculator when an attempt is made to release the test mode of the scientific electronic calculator during a test. FIG. 5 shows an example of an operation that is performed when a test mode release command is transmitted during a test from a wireless communication terminal separate from the mode control terminal 6 to the scientific electronic calculator 1 performing the test mode management processing shown in FIG. 3.

Before the start of the test, when a test examiner such as a teacher performs a predetermined operation on the mode control terminal 6, the mode control terminal 6 transmits a test mode transition command Q1 toward the scientific electronic calculator 1 in the test site by short-distance wireless communication such as BLE (step S11), as shown in FIG. 5. The scientific electronic calculator 1 that has received the test mode transition command Q1 stores and holds the terminal ID included in the received test mode transition command Q1 in the third storage area 113 of the storage unit 110, as a transition instruction terminal ID, and transitions to the test mode (step S2). After step S2, the scientific electronic calculator 1 can execute only a function that is permitted in the test mode. For this reason, for example, when the use of the user data such as functions and the like stored in the second storage area 112 is not permitted in the test mode, the user of the scientific electronic calculator 1 cannot cause the scientific electronic calculator 1 to execute calculations using the functions stored in the storage area 112, during the test.

However, when the scientific electronic calculator 1 can perform short-distance wireless communication such as BLE described above, a fraudulent test mode release command Q11 may be transmitted from a wireless communication terminal separate from the mode control terminal 6 to the scientific electronic calculator 1 for test without being noticed by the test examiner, as shown in FIG. 5. If the scientific electronic calculator 1 receives such a fraudulent test mode release command Q11 before the end of the test and releases the test mode before the end of the test, the user of the scientific electronic calculator 1 can cause the scientific electronic calculator 1 to execute a function that is prohibited from being used during the test, such as calculations using the functions stored in the second storage area 112, for example.

In contrast, when the scientific electronic calculator 1 shown in the present embodiment receives a test mode release command, the scientific electronic calculator determines whether the transmission source terminal ID of the test mode release command and the transition instruction terminal ID stored in the third storage area 113 of the storage unit 110 match each other (step S4). The transmission source terminal ID of the fraudulent test mode release command Q11 is different from the terminal ID of the mode control terminal 6 that transmits the normal test mode release command Q2 (refer to FIG. 4). For this reason, when the fraudulent test mode release command Q11 is received, the mode management unit 103 of the scientific electronic calculator 1 determines that the terminal IDs do not match (step S4; NO). In this case, the mode management unit 103 releases the test mode and initializes data (step S6). For this reason, for example, when the use of the user data such as functions stored in the second storage area 112 is not permitted in the test mode, if the test mode is released by the fraudulent test mode release command Q11, the user data stored in the second storage area 112 is initialized (deleted). Therefore, when the test mode is released by the fraudulent test mode release command Q11, the user of the scientific electronic calculator 1 cannot cause the scientific electronic calculator 1 to execute calculations or the like using the functions stored in the storage area 112 before the test, during the test.

In this way, when the scientific electronic calculator 1 of the present embodiment receives the fraudulent test mode release command Q11 from a wireless communication terminal separate from the mode control terminal 6, which is the transmission source of the test mode transition command, the scientific electronic calculator releases the test mode and returns to the normal mode, but can disable the user data such as functions prepared by the user before the transition to the test mode. For this reason, it is possible to prevent the cheating of releasing the test mode of the scientific electronic calculator 1 during the test by the fraudulent test mode release command Q11 and using a function that is prohibited from being used in the test.

The above-described embodiment is a specific example for easy understanding of the present invention, and the present invention is not limited to the embodiment. The information processing device, the control method and the program of the present invention can be diversely modified and changed without departing from the claims.

For example, in the above-described embodiment, the test mode management processing of releasing the test mode of the scientific electronic calculator 1 and initializing data when the fraudulent test mode release command Q11 is received has been exemplified. However, the processing that is performed by the scientific electronic calculator 1 when the fraudulent test mode release command Q11 is received is not limited thereto, and other processing is also possible. For example, when the scientific electronic calculator 1 receives the fraudulent test mode release command Q11, the scientific electronic calculator may not release the test mode, but may continue the test mode until the scientific electronic calculator receives a normal test mode release command Q2 or a predetermined period elapses. The predetermined period is, for example, equal to or longer than a period from a test start time to a test end time. Such a scientific electronic calculator 1 can also restrict fraudulent use in an academic-achievement test or the like, which results from fraudulently releasing the test mode with the fraudulent test mode release command Q11. In addition, since the test mode is not released by the fraudulent test mode release command Q11, the release of the test mode, which is not intended by a user (examinee), for example, by the fraudulent test mode release command Q11 transmitted from a malicious third party can be prevented.

Further, when the fraudulent test mode release command Q11 is received, the scientific electronic calculator 1 may notify that the fraudulent test mode release command Q11 has been received by using the display on the display 3 (display unit 130). For example, the scientific electronic calculator 1 may perform processing of changing a color of an outer edge portion of the display 3 (display unit 130), displaying information (pop-up) indicating that the test mode has been released each time the screen transitions, or the like, until a predetermined period elapses after receiving the fraudulent test mode release command Q11. In addition, in the case of the scientific electronic calculator 1 having an audio output unit such as a sound-generating element and a speaker, an alarm may be generated at the time when the fraudulent test mode release command Q11 is received. In this way, by notifying the reception of the fraudulent test mode release command Q11 through the display of the display 3, the alarm, etc., it is possible to notify the test examiner of a fraudulent release attempt or fraudulent release of the test mode, so that it is possible to restrict the fraudulent use in the academic-achievement test or the like.

First Modified Embodiment

Next, a first modified embodiment of the present embodiment will be described. In the above-described embodiment, the usable function during the test is restricted, in order to restrict the examinee from using a function, a program, and the like prepared before the test, during the test.

On the other hand, a scientific electronic calculator capable of executing arithmetic processing using a function, a program, and the like prepared by the user can be used, for example, for a test in which an examinee prepares a function, a program, and the like to give an answer during the test. For example, in recent school educations, programming is a compulsory subject, and as a programming test, a test is expected to be conducted in such a way that an examinee (child, student, etc.) prepares a program by using a scientific electronic calculator and submits the prepared program to a grader (teacher). In the present modified embodiment, data of a function, a program and the like prepared during a test is output to an external terminal.

Here, examples of data prepared and held by the scientific electronic calculator during the test mode will be described with reference to FIGS. 6A to 9.

Figures 7A, 7B:
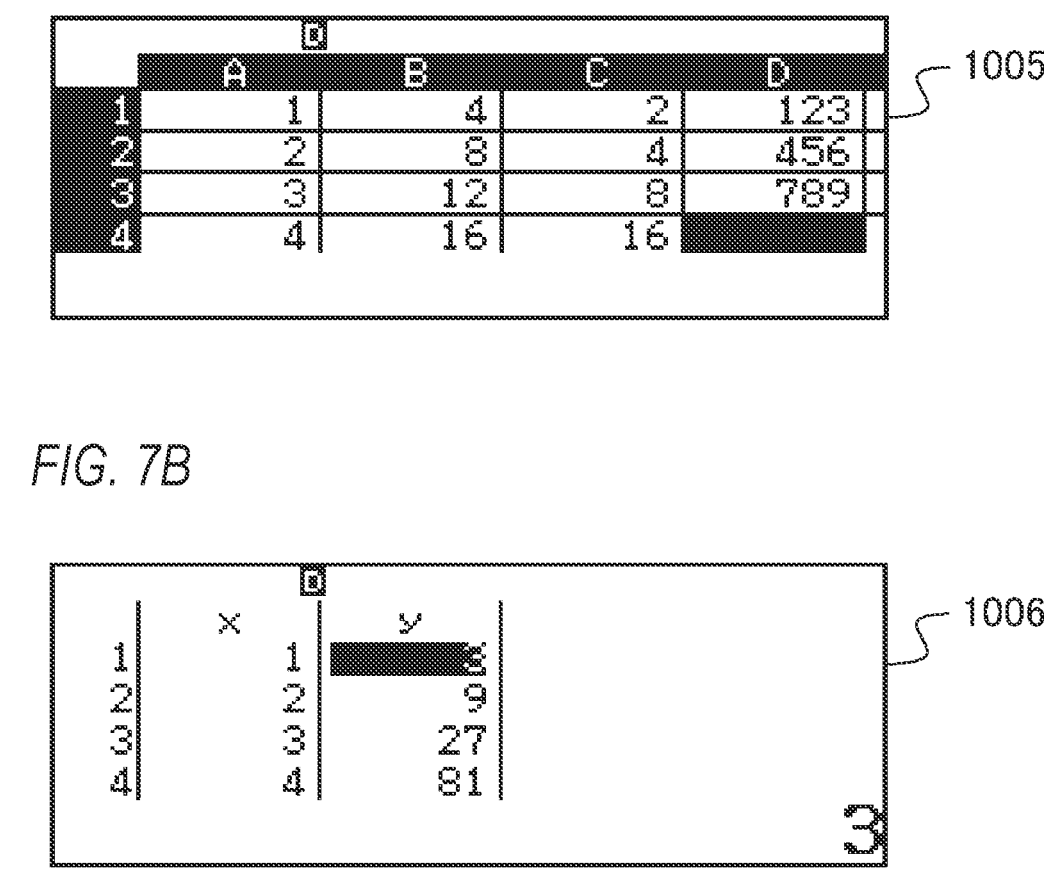
Figures 8A, 8B, 9:
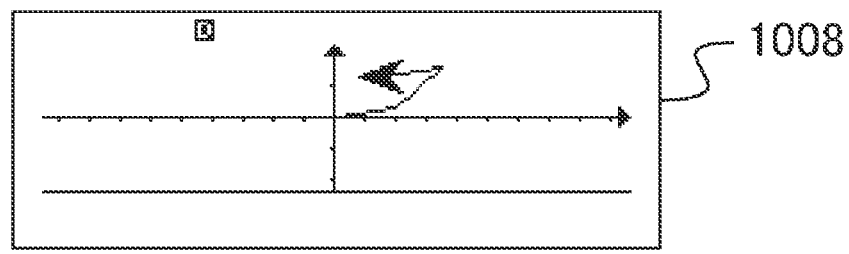
FIG. 8A is a view (3 thereof) illustrating an example of data that is held by the scientific electronic calculator during the test mode.
FIG. 8B is a view (3 thereof) illustrating an example of data that is held by the scientific electronic calculator during the test mode.
FIG. 9 is a view (4 thereof) for illustrating an example of data that is held by the scientific electronic calculator during the test mode.

FIGS. 6A to 6D are views (1 thereof) illustrating examples of data that is held by the scientific electronic calculator during the test mode. FIGS. 7A and 7B are views (2 thereof) illustrating examples of data that is held by the scientific electronic calculator during the test mode. FIGS. 8A and 8B are views (3 thereof) illustrating examples of data that is held by the scientific electronic calculator during the test mode. FIG. 9 is a view (4 thereof) illustrating an example of data that is held by the scientific electronic calculator during the test mode.

Figure 6A:
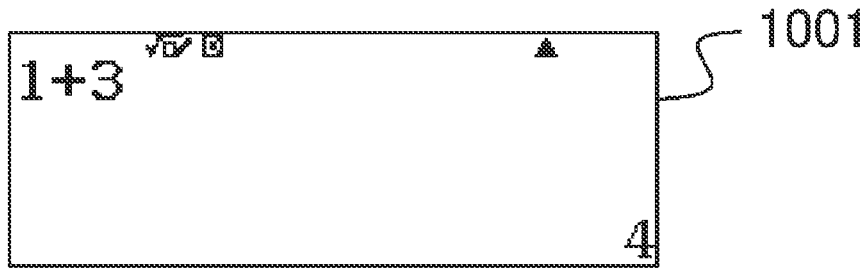
FIG. 6A is a view (1 thereof) illustrating an example of data that is held by the scientific electronic calculator in a test mode.
Figure 6B:
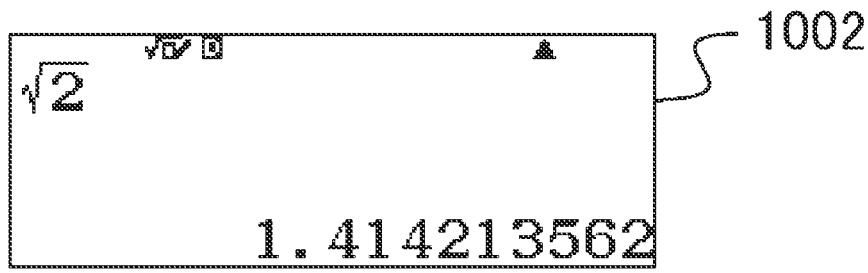
FIG. 6B is a view (1 thereof) illustrating an example of data that is held by the scientific electronic calculator during the test mode.
Figure 6C:
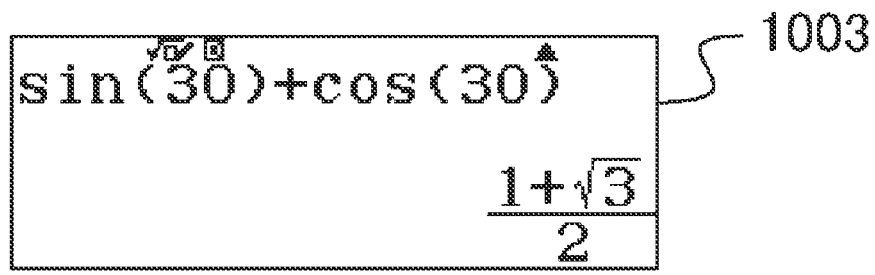
FIG. 6C is a view (1 thereof) illustrating an example of data that is held by the scientific electronic calculator during the test mode.
Figure 6D:
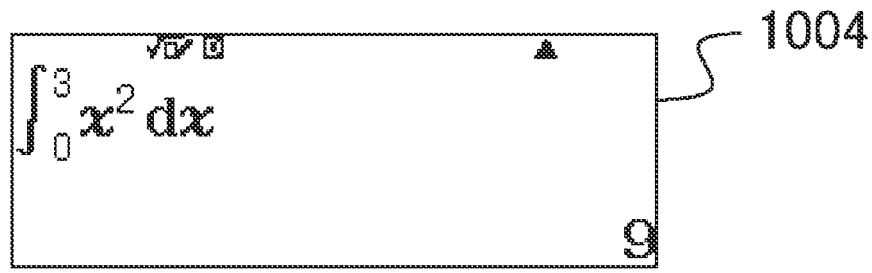
FIG. 6D is a view (1 thereof) illustrating an example of data that is held by the scientific electronic calculator during the test mode.

FIGS. 6A to 6D each show an example of a display screen of the display unit 130 (display 3) relating to a history of a calculation result among data that is held by the scientific electronic calculator 1 during the test mode. FIG. 6A illustrates a display screen 1001 at the time when the examinee operates the scientific electronic calculator 1 to perform an addition. At this time, the scientific electronic calculator 1 prepares data including, for example, a calculation formula "1+3" input by the input unit 120 and a calculation result "4", and stores the data in the second storage area 112. FIG. 6B illustrates a display screen 1002 at the time when the examinee operates the scientific electronic calculator 1 to calculate a square root. FIG. 6C illustrates a display screen 1003 at the time when the examinee operates the scientific electronic calculator 1 to calculate a trigonometric function. FIG. 6D illustrates a display screen 1004 at the time when the examinee operates the scientific electronic calculator 1 to calculate an integral. Even when calculations as shown in FIGS. 6B to 6D are performed, the scientific electronic calculator 1 prepares data including, for example, a calculation formula input by the input unit 120 and a calculation result, and stores the data in the second storage areal 12.

FIGS. 7A and 7B each show an example of a display screen of the display unit 130 (display 3) relating to input data for table calculation among data that is held by the scientific electronic calculator 1 during the test mode. FIG. 7A illustrates a display screen 1005 at the time when the examinee operates the scientific electronic calculator 1 to prepare a spreadsheet. At this time, the scientific electronic calculator 1 prepares data including, for example, numerical values input to each cell of the spreadsheet by the input unit 120, and stores the data in the second storage area 112. FIG. 7B illustrates a display screen 1006 at the time when the examinee operates the scientific electronic calculator 1 to prepare statistical processing data (Statistic data). Also at this time, the scientific electronic calculator 1 prepares data including, for example, numerical values input by the input unit 120, and stores the data in the second storage area 112.

FIGS. 8A and 8B each show an example of a display screen of the display unit 130 (display 3) relating to processing using a program among data that is held by the scientific electronic calculator 1 during the test mode. FIG. 8A illustrates display screens 1007*a* and 1007*b* at the time when the examinee operates the scientific electronic calculator 1 to create a program. A character string (program line) displayed on the display screen 1007*a* and a character string (program line) displayed on the display screen 1007*b* are continuous character strings included in one program. The display screens 1007*a* and 1007*b* are switched by scrolling the display screens up and down. FIG. 8B illustrates a display screen 1008 showing a result of executing the program illustrated on the display screens 1007*a* and 1007*b*. At this time, the scientific electronic calculator 1 prepares data including, for example, the program input by the input unit 120, and stores the data in the second storage area 112.

FIG. 9 illustrates a display screen 1009 of the display unit 130 (display 3) relating to a solution to a problem in the form of a mark sheet among data that is held by the scientific electronic calculator 1 during the test mode. The display screen 1009 includes question numbers, answer selection options, and answers input by the examinee operating the input unit 120. At this time, the scientific electronic calculator 1 stores, in the second storage area 112, data in which, for example, the question number and the answer input by the examinee are associated with each other.

Note that, the scientific electronic calculator 1 during the test mode may store all of the data described above with reference to FIGS. 6A to 9 in the second storage area 112, or may store only some data relating to the examination scoring among the data described above with reference to FIGS. 6A to 9 in the second storage area 112. In addition, the data prepared and stored in the second storage area 112 by the scientific electronic calculator 1 during the test mode is not limited to the data described above with reference to FIGS. 6A to 9, and may be other data.

Figure 10:
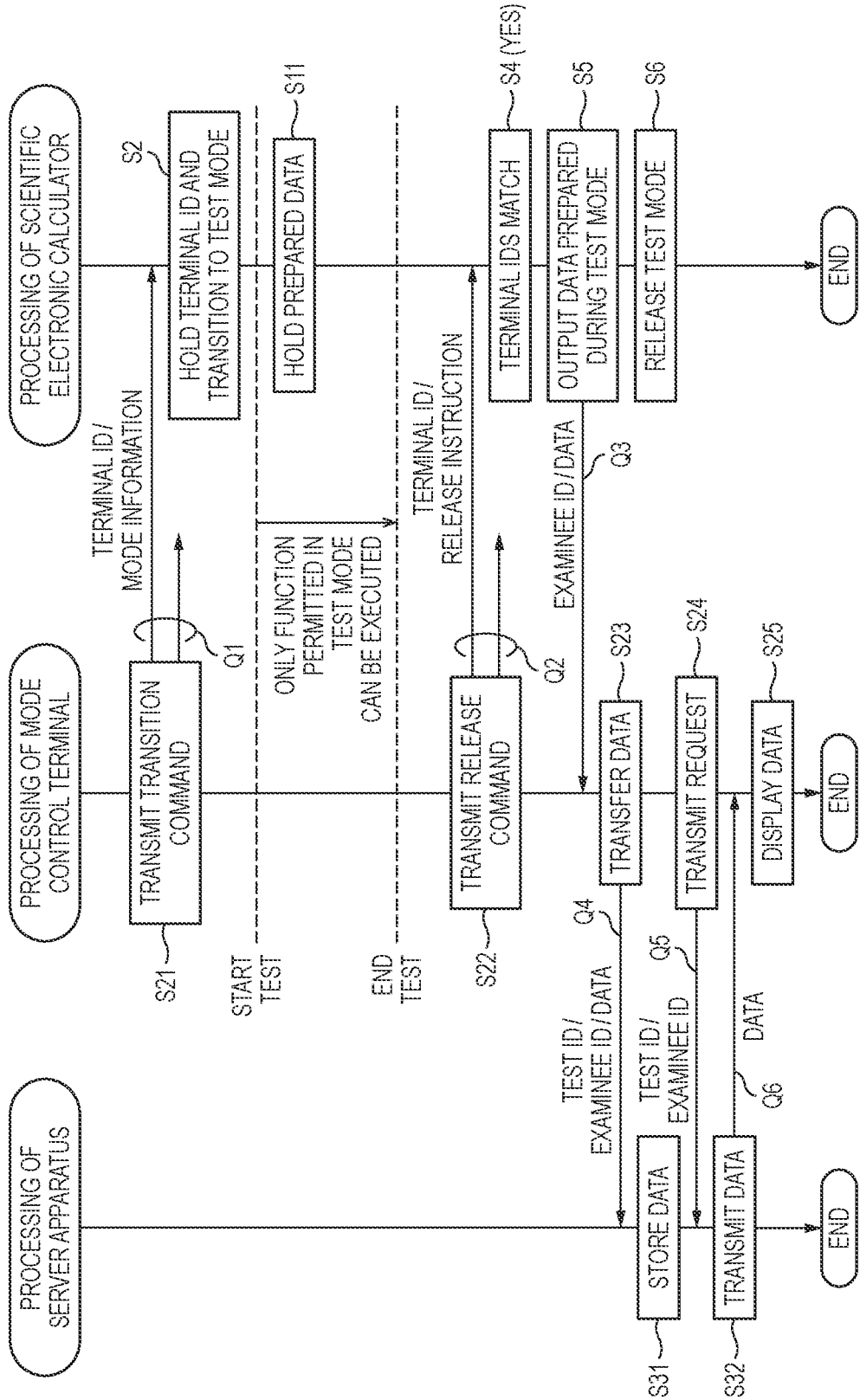
FIG. 10 is a sequence diagram illustrating processing that is performed in a test system according to a first modified embodiment of the embodiment.

FIG. 10 is a sequence diagram illustrating processing that is performed in the test system according to the present modified embodiment. FIG. 10 shows an example of operations of the mode control terminal 6, the scientific electronic calculator 1, and the server apparatus 7 when the scientific electronic calculator used in the test performs the test mode management processing shown in FIG. 3. In addition, although only one scientific electronic calculator is shown in FIG. 10, the test system according to the present embodiment may include a plurality of scientific electronic calculators.

In a case in which a test in which the scientific electronic calculator 1 can be used is conducted, a plurality of scientific electronic calculators 1 exist in a test site. Before the start of the test, when a test examiner such as a teacher performs a predetermined operation on the mode control terminal 6, the mode control terminal 6 transmits a test mode transition command Q1 toward each of the scientific electronic calculators 1 in the test site by short-distance wireless communication such as BLE (step S21), as shown in FIG. 10. The test mode transition command Q1 includes a terminal ID for identifying the mode control terminal 6 and mode information. The mode information includes, for example, information indicating a function (or a usable function) that is prohibited from being used when the scientific electronic calculator 1 transitions to the test mode. In addition, for example, when a problem in the form of a mark sheet as described with reference to FIG. 9 is included, the mode control terminal 6 may transmit, for example, data relating to an answer sheet to the scientific electronic calculator 1, together with the test mode transition command QL.

The scientific electronic calculators 1 that have received the test mode transition command Q1 each store and hold the terminal ID included in the received test mode transition command Q1 in the third storage area 113 of the storage unit 110, as a transition instruction terminal ID, and transition to the test mode (step S2). After step S2, each scientific electronic calculator 1 can execute only a function that is permitted in the test mode. That is, in a period from the start to the end of the test, each scientific electronic calculator 1 can execute only a function that is permitted in the test mode. For this reason, for example, when the mode information of the test mode transition command Q1 is information indicating that use of user data such as functions stored in the second storage area 112 before the start of the test is prohibited, the user of the scientific electronic calculator 1 cannot cause the scientific electronic calculator 1 to execute calculations or the like using the functions stored in the storage area 112 before the test, during the test. In addition, the mode information of the test mode transition command Q1 may include, for example, information indicating a usable function among the preset data such as functions and the like stored in the first storage area 111 of the storage unit 110 of the scientific electronic calculator 1. By restricting usable functions, for example, it is possible to cause only the same functions to be used in a plurality of types of scientific electronic calculators 1 having different numbers of functions and programs included in the preset data, and therefore, to reduce inequity according to models.

When the scientific electronic calculator 1 transitions to the test mode and the test is started, the scientific electronic calculator holds data prepared during the test mode (step S11). In step S11, the scientific electronic calculator 1 stores, for example, the data as described with reference to FIGS. 6A to 9 and other data in the second storage area 112 of the storage unit 110 in a state of being distinguishable from the data stored before the start of the test.

When the end time of the test arrives and the test examiner such as a teacher performs a predetermined operation on the mode control terminal 6, the mode control terminal 6 transmits a test mode release command Q2 toward each of the plurality of scientific electronic calculators 1 present in the test site (step S12).

The scientific electronic calculators 1 that have received the test mode release command Q2 each compare the terminal ID included in the received test mode release command Q2 with the transition instruction terminal ID stored in the third storage area 113 of the storage unit 110, and determine that the two terminal IDs match (step S4; YES). For this reason, each scientific electronic calculator 1 outputs the data prepared during the test mode to the mode control terminal 6 (step S5), and releases the test mode (step S6). In step S5, the scientific electronic calculator 1 transmits output data Q3 including the examinee ID and the prepared data to the mode control terminal 6. The examinee ID may be information for identifying the examinee, or may be information for identifying the scientific electronic calculator 1 used by the examinee. When the output data Q3 is transmitted to the mode control terminal 6 and the test mode is released, the scientific electronic calculator 1 returns to the state before the transition to the test mode, and ends the processing relating to the test.

The mode control terminal 6 that has received the output data Q3 from the scientific electronic calculator 1 transfers the received output data Q3 to the server apparatus 7 (step S23). In step S23, the mode control terminal 6 transmits, to the server apparatus 7, data Q4 including, for example, a test ID for identifying the test and the output data Q3 received from the scientific electronic calculator 1. The mode control terminal 6 transmits the output data Q3 output from each of the plurality of electronic calculators 1 to the server apparatus 7 individually or collectively. The server apparatus 7 that has received the data Q4 stores the output data Q3 transmitted (output) by the scientific electronic calculator 1 in a data storage area specified by the test ID, based on the test ID included in the data Q4 (step S31).

After storing the output data Q3 output from the scientific electronic calculator 1 in the server apparatus 7, the test examiner such as a teacher may use the mode control terminal 6 to browse the output data Q3 stored in the server apparatus 7 in order to, for example, perform scoring. In this case, the test examiner performs a predetermined operation on the mode control terminal 6 to transmit a request for data browsing to the server apparatus 7 (step S24). In step S24, the mode control terminal 6 transmits a request Q5 including the test ID and the examinee ID to the server apparatus 7.

The server apparatus 7 that has received the request Q5 specifies requested data based on the test ID and examinee ID included in the request Q5, and transmits the specified data to the mode control terminal 6 (step S32). In step S32, the server apparatus 7 extracts the output data Q3 including the examinee ID of the request Q5 from the output data Q3 stored in step S31, and transmits, to the mode control terminal 6, data Q6 included in the output data Q3 and prepared by the scientific electronic calculator 1 during the test mode.

The mode control terminal 6 that has received the data Q6 displays the received data Q6 (step S25). Thereby, the test examiner operating the mode control terminal 6 can designate an examinee, and browse and score the data prepared by the examinee operating the scientific electronic calculator 1 during the test.

In this way, in the test system according to the present embodiment, the data prepared by the scientific electronic calculator 1 during the test (during the test mode) can be stored in the server apparatus 7 via the mode control terminal 6 at the end of the test (when the test mode is released). For this reason, after releasing the test mode, by using the mode control terminal 6, it is possible to browse the data prepared by the examinee operating the scientific electronic calculator 1 during the test. Therefore, in the test system according to the present embodiment, for example, the answer data such as a program prepared using the scientific electronic calculator 1 can be output to an external terminal, and the scoring based on the answer data can be performed.

Note that, FIG. 10 shows the example in which the data stored in the server apparatus 7 is browsed using the mode control terminal 6 configured to perform transition to the test mode and release of the test mode. However, the data stored in the server apparatus 7 may also be browsed using a display device included in the server apparatus 7, a display device connected to the server apparatus 7 or other information processing device, without being limited to the mode control terminal 6. For this reason, when browsing the data stored in the server apparatus 7 by using the mode control terminal 6 or the like, for example, a request including information for identifying a person who wants to browse is transmitted to the server apparatus 7, and the data can be preferably browsed only when the person who wants to browse has been registered in a list of persons who can browse. Thereby, it is possible to prevent leakage of information, falsification of data, and the like, which are caused by a third party who is not permitted to browse data browsing the data.

In addition, as exemplified in the present embodiment, the test mode transition command Q1 and the test mode release command Q2 are transmitted using short-range wireless communication such as BLE, so that a plurality of scientific electronic calculators 1 present in the test site can be efficiently caused to transition to the test mode and to release the test mode.

Further, as exemplified in the present modified embodiment, the scientific electronic calculator 1 determines whether the received test mode release command is transmitted from the mode control terminal 6, and controls the release of the test mode and the output of data prepared during the test mode, based on a result of the determination.

Figure 11:
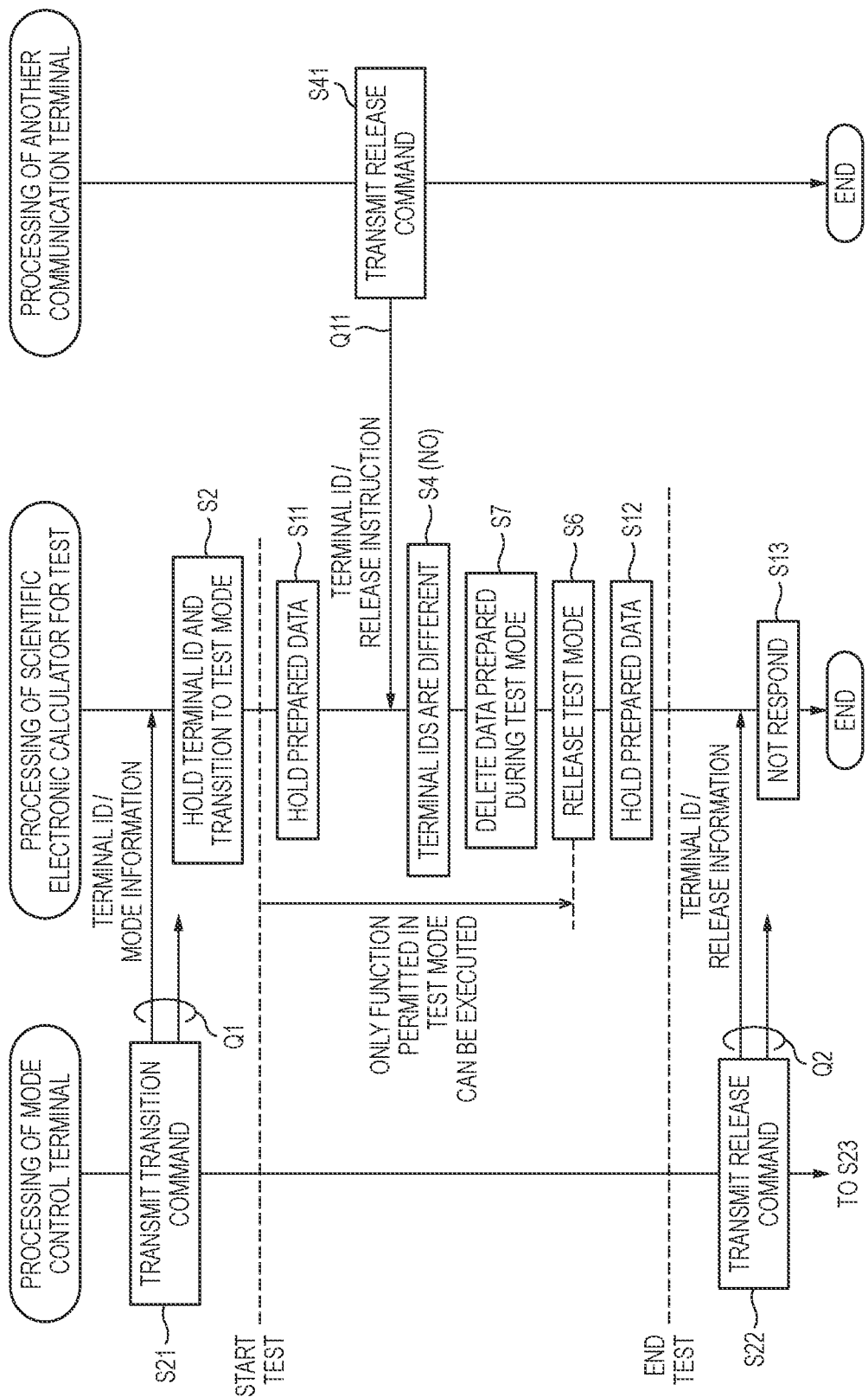
FIG. 11 is a sequence diagram illustrating processing of the scientific electronic calculator, which is performed when an attempt is made to fraudulently release the test mode of the scientific electronic calculator.

FIG. 11 is a sequence diagram illustrating processing of the scientific electronic calculator, which is performed when an attempt is made to fraudulently release the test mode of the scientific electronic calculator. FIG. 11 shows an example of an operation that is performed when a test mode release command is transmitted during a test from a wireless communication terminal separate from the mode control terminal 6 to the scientific electronic calculator 1 performing the test mode management processing shown in FIG. 3.

Before the start of the test, when a test examiner such as a teacher performs a predetermined operation on the mode control terminal 6, the mode control terminal 6 transmits the test mode transition command Q1 toward the scientific electronic calculator 1 in the test site by short-distance wireless communication such as BLE (step S21), as shown in FIG. 11. The scientific electronic calculator 1 that has received the test mode transition command Q1 stores and holds the terminal ID included in the received test mode transition command Q1 in the third storage area 113 of the storage unit 110, as a transition instruction terminal ID, and transitions to the test mode (step S2). After step S2, the scientific electronic calculator 1 can execute only a function that is permitted in the test mode. Further, when the scientific electronic calculator 1 transitions to the test mode and the test is started, the scientific electronic calculator stores and holds data prepared after the transition to the test mode in the second storage area 112 of the storage unit 110 (step S11).

When the scientific electronic calculator 1 can perform short-distance wireless communication such as BLE described above, a fraudulent test mode release command Q11 may be transmitted from a wireless communication terminal separate from the mode control terminal 6 to the scientific electronic calculator 1 for test without being noticed by the test examiner, as shown in FIG. 11. If the scientific electronic calculator 1 receives such a fraudulent test mode release command Q11 before the end of the test and releases the test mode before the end of the test, the user of the scientific electronic calculator 1 can cause the scientific electronic calculator 1 to execute a function that is prohibited from being used in the test, such as calculations using the functions stored in the second storage area 112 before the start of the test, during the test.

In contrast, when the scientific electronic calculator 1 shown in the present embodiment receives a test mode release command, the scientific electronic calculator determines whether the transmission source terminal ID of the test mode release command and the transition instruction terminal ID stored in the third storage area 113 of the storage unit 110 match each other (step S4). The transmission source terminal ID of the fraudulent test mode release command Q11 is different from the terminal ID of the mode control terminal 6 that transmits the normal test mode release command Q2. For this reason, when the fraudulent test mode release command Q11 is received, the mode management unit 103 of the scientific electronic calculator 1 determines that the terminal IDs do not match (step S4; NO). In this case, the mode management unit 103 deletes the data prepared during the test mode (step S7) and releases the test mode (step S6). That is, when the fraudulent test mode release command Q11 is received, the scientific electronic calculator 1 deletes the data prepared and held (data held in step S11) in a period from the transition to the test mode to the release of the test mode, without outputting the same.

Although not shown in FIG. 11, the scientific electronic calculator 1 that has released the test mode by the fraudulent test mode release command Q11 can execute a function that is restricted (prohibited) from being used during the test mode. In addition, the scientific electronic calculator 1 that has released the test mode by the fraudulent test mode release command Q11 can store and hold data prepared after the release in the second storage area 112 (step S12). For this reason, when the test mode is released by the fraudulent test mode release command Q11, data fraudulently prepared using a function that is prohibited from being used in the test can be stored and held in the second storage area 112 during the test. However, since the data held in step S12 is data prepared after the test mode is released, the data is different from the data prepared during the test mode, and does not include information, which indicates that the data is data prepared during the test mode and distinguishable from the data stored in the second storage area 112 before the transition to the test mode.

When the end time of the test arrives and the test examiner such as a teacher performs a predetermined operation on the mode control terminal 6, the mode control terminal 6 transmits a test mode release command Q2 toward each of the plurality of scientific electronic calculators 1 present in the test site (step S12).

When the test mode release command Q2 is received, the scientific electronic calculator 1 that has not fraudulently released the test mode by the fraudulent test mode release command Q11 outputs (transmits) the data prepared during the test mode to the mode control terminal 6, as described above with reference to FIG. 10.

On the other hand, in the case of the scientific electronic calculator 1 that has fraudulently released the test mode, the test mode has been released and the data prepared during the test mode has been deleted at the time when the test mode release command Q2 is received. For this reason, the scientific electronic calculator 1 that has fraudulently released the test mode does not respond to the test mode release command Q2 (step S13). That is, the output data transmitted to and stored in the server apparatus 7 via the mode control terminal 6 at the time when the test mode is released does not include the data prepared by the scientific electronic calculator 1 that has fraudulently released the test mode. Therefore, for example, by specifying an examinee whose output data is not stored based on the examinee ID of the output data stored in the server apparatus 7, it is possible to easily specify an examinee who used the scientific electronic calculator 1 that has fraudulently released the test mode.

In this way, when the scientific electronic calculator 1 of the present embodiment receives the fraudulent test mode release command Q11 from the wireless communication terminal separate from the mode control terminal 6, which is a transmission source of the test mode transition command, the scientific electronic calculator cannot output the data prepared during the test mode, after the end of the test. For this reason, it is possible to suppress the cheating of releasing the test mode of the scientific electronic calculator 1 during the test by the fraudulent test mode release command Q11 and using a function that is prohibited from being used in the test.

Second Modified Embodiment

Figure 12:
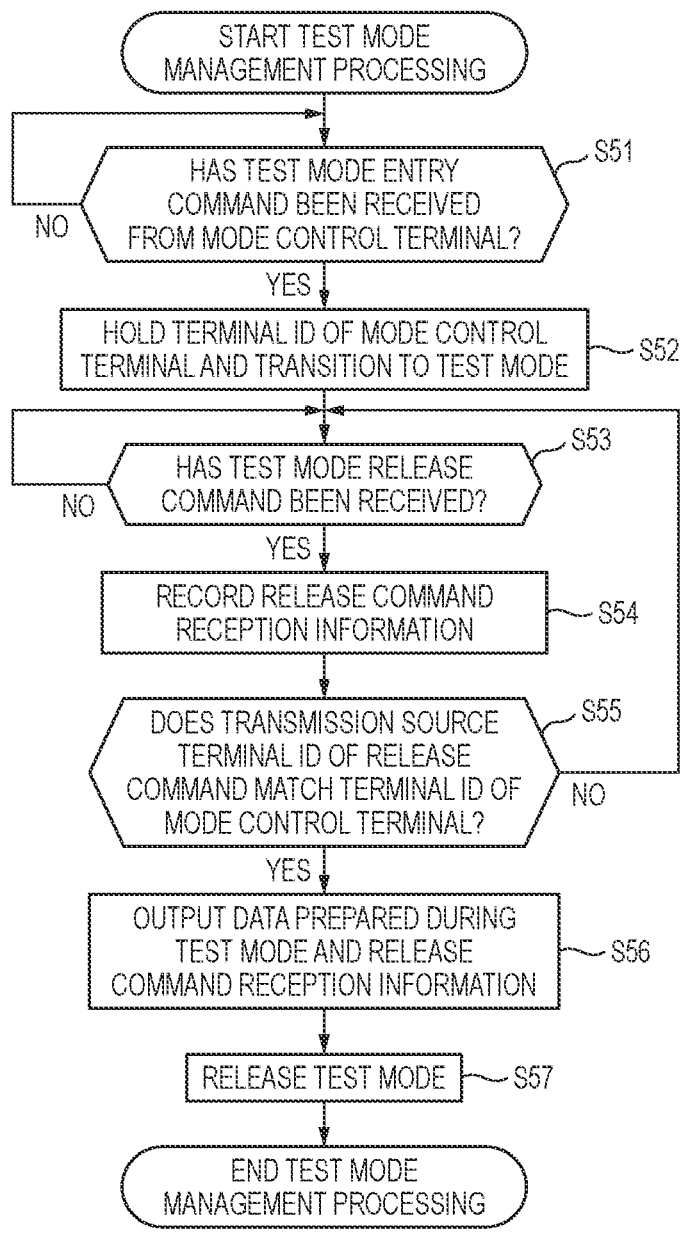
FIG. 12 is a flow chart illustrating a second modified embodiment of the test mode management processing.

FIG. 12 is a flow chart illustrating a second modified embodiment of the present embodiment. The test mode management processing shown in FIG. 12 is performed, for example, after a power supply of the scientific electronic calculator 1 is turned on in a test site (for example, a school classroom) and wireless communication by the communication unit 140 is enabled.

In the second modified embodiment of the test mode management processing, the mode management unit 103 of the control unit 100 of the scientific electronic calculator 1 first determines whether a test mode transition command has been received from the mode control terminal 6 (step S51). Step S51 corresponds to step S1 in the flow chart shown in FIG. 3. When the test mode transition command is not received (step S51; NO), the mode management unit 103 repeats the determination of step S51. When the test mode transition command is received (step S51; YES), the mode management unit 103 holds the terminal ID of the mode control terminal 6 and transitions to the test mode (step S52). Step S52 corresponds to step S2 in the flow chart shown in FIG. 3. After step S52, when a test is started, the scientific electronic calculator 1 may perform arithmetic processing or the like based on the input information input by the input unit 120 within a permitted range in the test mode, in parallel with the test mode management processing shown in FIG.

12. In addition, the scientific electronic calculator 1 that has transitioned to the test mode stores predetermined data of the data prepared during the test mode in the second storage area 112 in a state of being distinguishable from the data stored in the second storage area 112 of the storage unit 110 before the transition to the test mode.

After transitioning to the test mode, the mode management unit 103 determines whether a test mode release command from the external terminal has been received by the communication unit 140 (step S53). Step S53 corresponds to step S3 in the flow chart shown in FIG. 3. When the test mode release command is not received (step S53; NO), the mode management unit 103 repeats the determination in step S53.

When the test mode release command is received (step S53; YES), the mode management unit 103 records release command reception information (step S54), and determines whether a transmission source terminal ID of the test mode release command matches the terminal ID of the mode control terminal 6 (step S55). In step S54, the mode management unit 103 stores, for example, release command reception information including a reception time of the test mode release command in the second storage area 112 of the storage unit 110. Step S55 corresponds to step S4 in the flow chart shown in FIG. 3.

When the transmission source terminal ID of the test mode release command matches the terminal ID of the mode control terminal 6 (step S55; YES), the mode management unit 103 outputs the data prepared during the test mode and the release command reception information (step S56), releases the test mode (step S57), and ends the test mode management processing. In step S56, the mode management unit 103 reads out the data prepared during the test mode and the release command reception information from the second storage area 112 of the storage unit 110, and transmits output data including the read data, the examinee ID, and the release command reception information to the mode control terminal 6 by using the communication unit 140. Step S57 corresponds to step S6 in the flow chart shown in FIG. 3.

On the other hand, when the transmission source terminal ID of the test mode release command does not match the terminal ID of the mode control terminal (step S55; NO), the mode management unit 103 returns to the determination of step S53. That is, in the test mode management processing shown in FIG. 12, the test mode is not released when the terminal IDs do not match. For this reason, even after the fraudulent test mode release command Q11 is received during the test, the scientific electronic calculator 1 continues the test mode until the normal test mode release command Q2 is received from the mode control terminal 6. In addition, when releasing the test mode by receiving the normal test mode release command Q2 from the mode control terminal 6, the release command reception information including the reception time of the test mode release command together with the data prepared during the test mode is output, so that the test examiner such as a teacher can easily identify an examinee who attempted to fraudulently release the test mode of the scientific electronic calculator 1. For this reason, by causing the scientific electronic calculator 1 to perform the test mode management processing as shown in FIG. 12, it is possible to suppress the cheating of fraudulently releasing the test mode of the scientific electronic calculator 1 to use the scientific electronic calculator 1.

Further, by not releasing the test mode when the fraudulent test mode release command Q11 is received, deletion of the data prepared during the test mode, which is not intended by a user (examinee) of the scientific electronic calculator 1, for example, by the fraudulent test mode release command Q11 transmitted by a malicious third party using an external terminal separate from the mode control terminal 6, can be prevented. Further, when the scientific electronic calculator 1 is caused to perform the test mode management processing as shown in FIG. 12, the data of all examinees using the scientific electronic calculator 1 can be stored in the server apparatus 7. This makes it possible to prevent, for example, an examinee whose data has not been stored in the server apparatus 7 due to a communication error between the mode control terminal 6 and the scientific electronic calculator 1, etc., from being mistaken for an examinee who attempted to fraudulently release the test mode of the scientific electronic calculator 1.

Note that, the test mode management processing in which the test mode is not released when the fraudulent test mode release command Q11 is received is not limited to the processing shown in FIG. 12 and can be changed as appropriate. For example, if the test mode is not released when the fraudulent test mode release command Q11 is received, for example, the recording and output of the release command reception information may be omitted. Further, the scientific electronic calculator 1 may be configured to record the release command reception information only when the fraudulent test mode release command Q11, for example, is received.

The information processing device according to the present invention is not limited to the scientific electronic calculator 1 exemplified in the above-described embodiment, and may also be another electronic device having functions equivalent to those of the scientific electronic calculator 1, for example, a general-purpose computer such as a tablet-type computer, a smart phone, or the like that can be operated as a scientific electronic calculator by executing a program including the test mode management processing shown in FIG. 3. Further, the information processing device according to the present invention is not limited to a calculator capable of performing calculations using complex functions or programs, such as the scientific electronic calculator 1, and may be another device approved for use in a specific use scene such as an academic-achievement test or a certification test by restricting (prohibiting) some functions thereof from being used.

The present application is based on Japanese Patent Application Nos. 2020-154936 and 2020-154937 filed on Sep. 15, 2020, the contents of which are incorporated herein by reference.

The invention claimed is:

1. An information processing device comprising:
   a communication unit configured to communicate with a predetermined external terminal and an external terminal; and
   a controller configured to:
      receive, through the communication unit, transition instruction information from the predetermined external terminal, the transition instruction information including a predetermined terminal ID and instructing a transition to a function restriction mode;
      in response to receiving the transition instruction information, transition to the function restriction mode to restrict a usable function;
      receive, through the communication unit, release instruction information from the external terminal, the release instruction information including a transmission source terminal ID and instructing release of the function restriction mode;

determine whether the transmission source terminal ID received from the external terminal matches the predetermined terminal ID received from the predetermined external terminal;

in response to determining that the transmission source terminal ID matches the predetermined terminal ID, perform a first process to release the function restriction mode; and in response to determining that the transmission source ID does not match the predetermined terminal ID, perform a second process different from the first process to perform at least an additional restriction of a function and/or information.

2. The information processing device according to claim 1, wherein the controller is configured to enable all functions usable before transitioning to the function restriction mode, when releasing the function restriction mode.

3. The information processing device according to claim 1, wherein the controller is configured to release the function restriction mode and to initialize functions of the information processing device, in response to determining that the transmission source terminal ID received from the external terminal does not match the predetermined terminal ID received from the predetermined external terminal.

4. The information processing device according to claim 3, further comprising a storage unit configured to store user data prepared by a user of the information processing device,
wherein the controller is configured to delete the user data in the storage unit when initializing functions of the information processing device.

5. The information processing device according to claim 1, wherein the controller is configured to continue the function restriction mode, in response to determining that the transmission source terminal ID received from the external terminal does not match the predetermined terminal ID received from the predetermined external terminal.

6. The information processing device according to claim 5, wherein the controller is configured to release the function restriction mode, when receiving the release instruction information from the predetermined external terminal that has transmitted the transition instruction information, or when a predetermined period elapses after determining that the transmission source terminal ID received from the external terminal does not match the predetermined terminal ID received from the predetermined external terminal.

7. The information processing device according to claim 1, further comprising a display unit,
wherein the controller is configured to cause the display unit to display information indicating a result of the determination, in response to determining that the transmission source terminal ID received from the external terminal does not match the predetermined terminal ID received from the predetermined external terminal.

8. The information processing device according to claim 7, wherein the controller is configured to change a display color of a predetermined portion within a display area of the display unit.

9. The information processing device according to claim 7, wherein the controller is configured to display, in the display area of the display unit, information indicating that the release instruction information from the external terminal different from the predetermined external terminal that has transmitted the transition instruction information is received, each time display of the display unit is switched.

10. The information processing device according to claim 1, further comprising an audio output unit,
wherein the controller is configured to cause the audio output unit to output a sound indicating a result of the determination, in response to determining that the transmission source terminal ID received from the external terminal does not match the predetermined terminal ID received from the predetermined external terminal.

11. The information processing device according to claim 1, wherein the controller is configured to control output of data prepared during the function restriction mode, based on a result of the determination as to whether the transmission source terminal ID received from the external terminal matches the predetermined terminal ID received from the predetermined external terminal.

12. The information processing device according to claim 11, wherein the controller is configured to output the data prepared during the function restriction mode to an external terminal designated as an output destination of the data, in response to determining that the transmission source terminal ID received from the external terminal matches the predetermined terminal ID received from the predetermined external terminal.

13. The information processing device according to claim 11, wherein the controller is configured not to output the data prepared during the function restriction mode, in response to determining that the transmission source terminal ID received from the external terminal does not match the predetermined terminal ID received from the predetermined external terminal.

14. The information processing device according to claim 13, wherein the controller is configured to delete the data prepared during the function restriction mode and to release the function restriction mode, in response to determining that the transmission source terminal ID received from the external terminal does not match the predetermined terminal ID received from the predetermined external terminal.

15. The information processing device according to claim 1, wherein the communication unit is configured to communicate with the external terminal by wireless communication.

16. The information processing device according to claim 1, wherein the information processing device is a scientific electronic calculator usable in a test by restricting usable functions.

17. A control method comprising:
receiving, through a communication unit, transition instruction information from a predetermined external terminal, the transition instruction information including a predetermined terminal ID and instructing a transition to a function restriction mode;

in response to receiving the transition instruction information, transitioning to the function restriction mode to restrict a usable function;

receiving, through the communication unit, release instruction information from the external terminal, the release instruction information including a transmission source terminal ID and instructing release of the function restriction mode;

determining whether the transmission source terminal ID received from the external terminal matches the predetermined terminal ID received from the predetermined external terminal;

in response to determining that the transmission source terminal ID matches the predetermined terminal ID, performing a first process to release the function restriction mode; and in response to determining that the transmission source ID does not match the predetermined terminal ID, performing a second process different from the first process to perform at least an additional restriction of a function and/or information.

18. A non-transitory computer-readable storage medium storing a program that causes an information processing device to at least execute:
receiving, through a communication unit, transition instruction information from a predetermined external terminal, the transition instruction information including a predetermined terminal ID and instructing a transition to a function restriction mode;
in response to receiving the transition instruction information, transitioning to the function restriction mode to restrict a usable function;
receiving, through the communication unit, release instruction information from the external terminal, the release instruction information including a transmission source terminal ID and instructing release of the function restriction mode;
determining whether the transmission source terminal ID received from the external terminal matches the predetermined terminal ID received from the predetermined external terminal;
in response to determining that the transmission source terminal ID matches the predetermined terminal ID, performing a first process to release the function restriction mode; and
in response to determining that the transmission source ID does not match the predetermined terminal ID, performing a second process different from the first process to perform at least an additional restriction of a function and/or information.

* * * * *